(12) United States Patent  (10) Patent No.: US 7,183,538 B2
Minokami et al.  (45) Date of Patent: *Feb. 27, 2007

(54) APPARATUS FOR ADJUSTING A SIGNAL BASED ON A POSITION OF A MOVABLE MEMBER

(75) Inventors: Jun Minokami, Tokorozawa (JP);
Yoshinori Kataoka, Tokorozawa (JP);
Yoshiyuki Kakuta, Tokorozawa (JP);
Chihaya Oga, Tokorozawa (JP);
Takeaki Funada, Tokorozawa (JP);
Youichi Yamada, Tokorozawa (JP);
Satomi Kasuya, Tokorozawa (JP);
Tatsuya Shiraishi, Tokyo-to (JP)

(73) Assignee: Pioneer Corporation, Tokyo To (JP)

( * ) Notice: Subject to any disclaimer, the term of this patent is extended or adjusted under 35 U.S.C. 154(b) by 48 days.

This patent is subject to a terminal disclaimer.

(21) Appl. No.: 10/916,424

(22) Filed: Aug. 12, 2004

(65) Prior Publication Data

US 2005/0041822 A1 Feb. 24, 2005

(30) Foreign Application Priority Data

Aug. 19, 2003 (JP) .......................... P2003-207946

(51) Int. Cl.
*G01D 5/34* (2006.01)
(52) U.S. Cl. .......................... 250/231.18; 250/231.13; 250/231.14; 356/616; 356/617; 381/109; 381/119
(58) Field of Classification Search ................ 381/109, 381/119; 33/706, 707, 1 PT; 341/11, 13; 250/231.13–231.18; 356/616, 617; 369/4
See application file for complete search history.

(56) References Cited

U.S. PATENT DOCUMENTS

| | | | | |
|---|---|---|---|---|
| 4,412,182 A | | 10/1983 | Yochum | |
| 4,429,219 A | * | 1/1984 | Yochum et al. | 250/229 |
| 5,317,641 A | * | 5/1994 | Yasuda et al. | 381/119 |
| 5,513,268 A | * | 4/1996 | Bironas et al. | 381/109 |
| 5,719,570 A | * | 2/1998 | Breitbarth | 341/13 |
| 5,940,521 A | * | 8/1999 | East et al. | 381/119 |
| 5,986,584 A | * | 11/1999 | Breitbarth | 341/13 |

(Continued)

FOREIGN PATENT DOCUMENTS

| | | | |
|---|---|---|---|
| GB | 2 076 602 A | | 5/1981 |
| JP | 2003021541 A | * | 1/2003 |
| WO | WO 03/006928 A1 | | 1/2003 |

*Primary Examiner*—Stephone B. Allen
*Assistant Examiner*—Davienne Monbleau
(74) *Attorney, Agent, or Firm*—Sughrue Mion, PLLC

(57) ABSTRACT

A signal adjusting apparatus comprises a movable member, a first detecting device, a second detecting device, and a correction device. The member is movable in a movable range composed of a plurality of intervals. The first detecting device detects one of the intervals where the member is located. The first detecting device is constituted by a first movable portion mounted on the member and a first fixed portion spaced apart from the first movable portion. The one of the intervals is an absolute position. The second detecting device detects a relative position of the member within the detected interval. The second detecting device is constituted by a second movable portion mounted on the member and a second fixed portion spaced apart from the second movable portion. The correction device corrects the detected relative position based on a relationship between the absolute position and the relative position stored in a memory.

4 Claims, 12 Drawing Sheets

U.S. PATENT DOCUMENTS

| | | |
|---|---|---|
| 6,301,365 B1 | 10/2001 | Yamada et al. |
| 6,617,572 B2 * | 9/2003 | Ishizuka ................. 250/237 G |
| 6,813,361 B1 * | 11/2004 | Jeffs et al. .................. 381/119 |
| 6,856,260 B2 * | 2/2005 | Hulett et al. ................... 341/16 |
| 6,917,689 B2 * | 7/2005 | Cheng ........................ 381/119 |
| 2002/0126862 A1 * | 9/2002 | Meraz ........................ 381/119 |
| 2003/0218125 A1 * | 11/2003 | Igaki et al. ............ 250/231.13 |
| 2005/0006571 A1 * | 1/2005 | Keong ................... 250/231.13 |
| 2005/0185806 A1 * | 8/2005 | Salvador et al. ............ 381/119 |

* cited by examiner

APPARATUS FOR ADJUSTING A SIGNAL BASED ON A POSITION OF A MOVABLE MEMBER

BACKGROUND OF THE INVENTION

1. Field of the Invention

The present invention relates to a signal adjusting apparatus, and more particularly to a signal adjusting apparatus which is operative to adjust an electrical signal.

2. Description of the Related Art

Up to now, there have been proposed a variety of conventional signal adjusting apparatuses each of which is operative to adjust an electrical signal. One typical example of the conventional signal adjusting apparatuses is adapted to an audio mixer which is operative to adjust an audio signal. This type of signal adjusting apparatus is disclosed in U.S. Pat. No. 6,301,365.

The conventional signal adjusting apparatus thus proposed comprises an operation lever which is movably supported, and a slide volume which detects a position of the operation lever and adjusts the audio signal based on an adjustment state corresponding to the position of the operation lever. The adjustment state is, for example, previously provided to indicate a volume level of the audio signal.

The conventional signal adjusting apparatus described above, however, encounters such a problem that the slide volume cannot securely adjust the audio signal, resulting from the fact that the slide volume is a contact type of detector with an electrical and mechanical contact tending to be worn down under the state that the operation lever is repeatedly moved by an operator.

SUMMARY OF THE INVENTION

It is, therefore, an object of the present invention to provide a signal adjusting apparatus which can securely adjust an electrical signal.

The above object of the present invention can be achieved by a signal adjusting apparatus which adjusts an electrical signal, comprising: a movable member which is movable in a movable range composed of a plurality of intervals; a first detecting device which detects one of the intervals where the movable member is located, the first detecting device being constituted by a first movable portion mounted on the movable member and a first fixed portion spaced apart from the first movable portion; a second detecting device which detects a position of the movable member within the interval detected by the first detecting device, the second detecting device being constituted by a second movable portion mounted on the movable member and a second fixed portion spaced apart from the second movable portion; and an adjusting device which adjusts the electrical signal based on an adjustment state corresponding to the position of the movable member.

BRIEF DESCRIPTION OF THE DRAWINGS

The features and advantages of the signal adjusting apparatus according to the present invention will be more clearly understood from the following description taken in conjunction with the accompanying drawings in which.

DETAILED DESCRIPTION OF THE PREFERRED EMBODIMENTS

Figure 1:
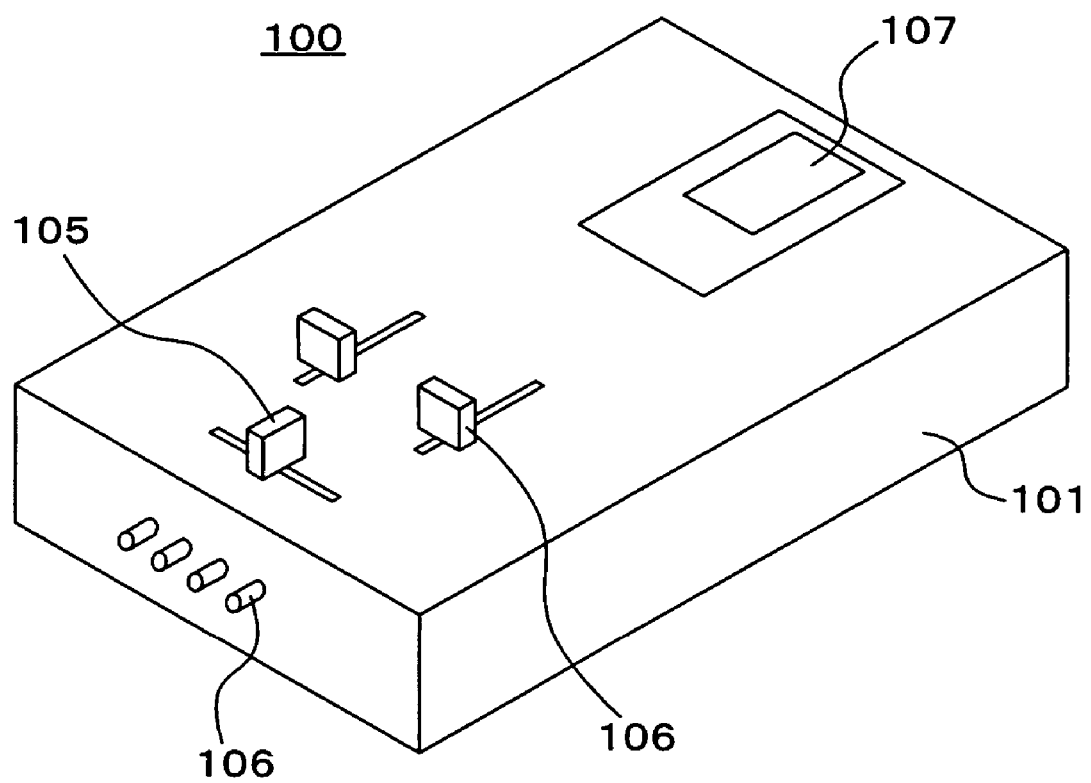
FIG. 1 is a perspective view showing the signal adjusting apparatus in one preferred embodiment according to the present invention.

One preferred embodiment of the signal adjusting apparatus according to the present invention will now be described in detail in accordance with the accompanying drawings.

Referring now to the drawings, in particular to FIGS. 1 to 12, there is shown one preferred embodiment of the signal adjusting apparatus according to the present invention.

The construction of the signal adjusting apparatus in this embodiment will be described hereinafter.

The signal adjusting apparatus in this embodiment is applied to an audio mixer which is operative to adjust an audio signal.

In this embodiment, while the signal adjusting apparatus according to the present invention is applied to an audio mixer used for a variety of audio instruments, the signal adjusting apparatus according to the present invention may be applied to a controller used for a variety of robot instruments, a controller used for a variety of game machines, an interface used for a variety of electric musical instruments, and so on.

Figure 2:
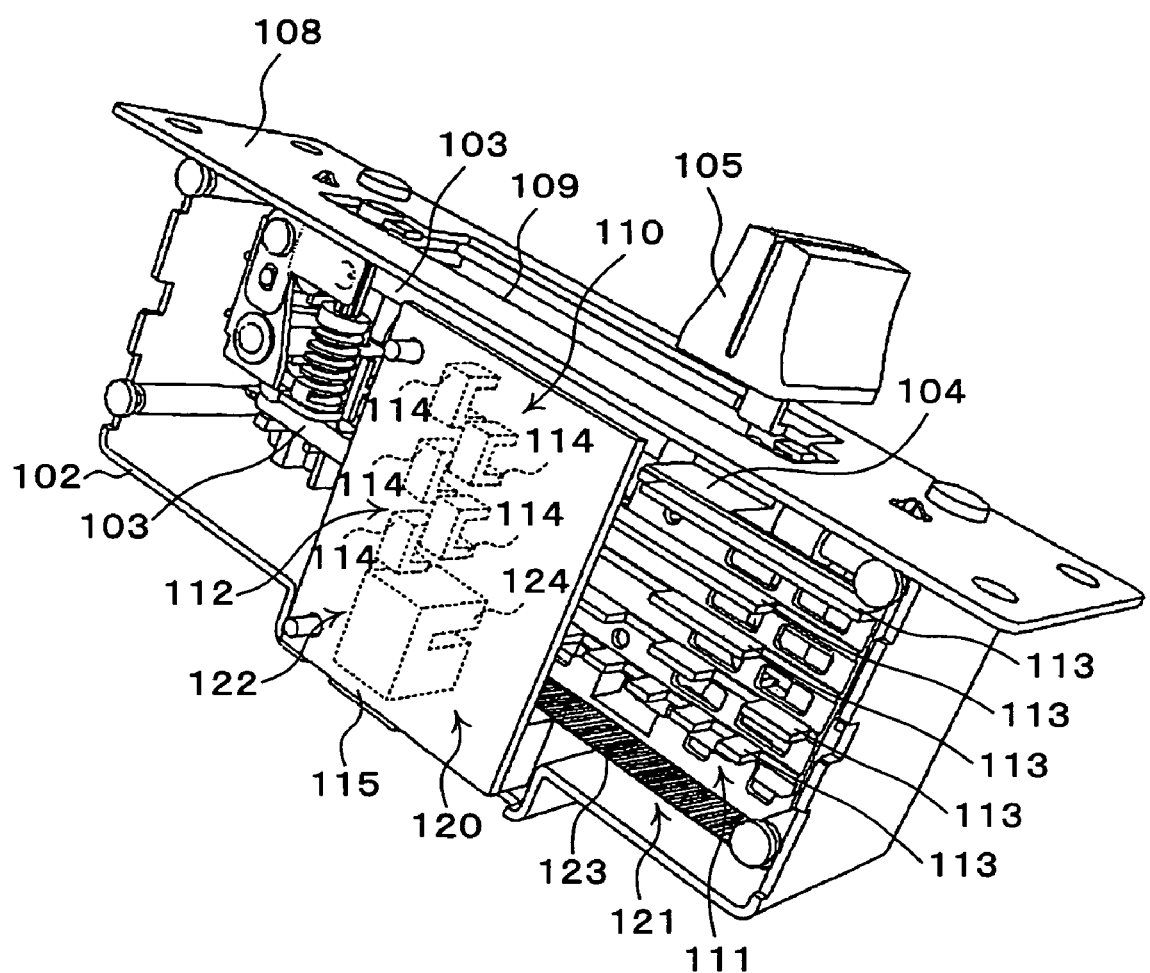
FIG. 2 is an enlarged perspective view showing a main part of the signal adjusting apparatus in one preferred embodiment according to the present invention.
Figure 3:
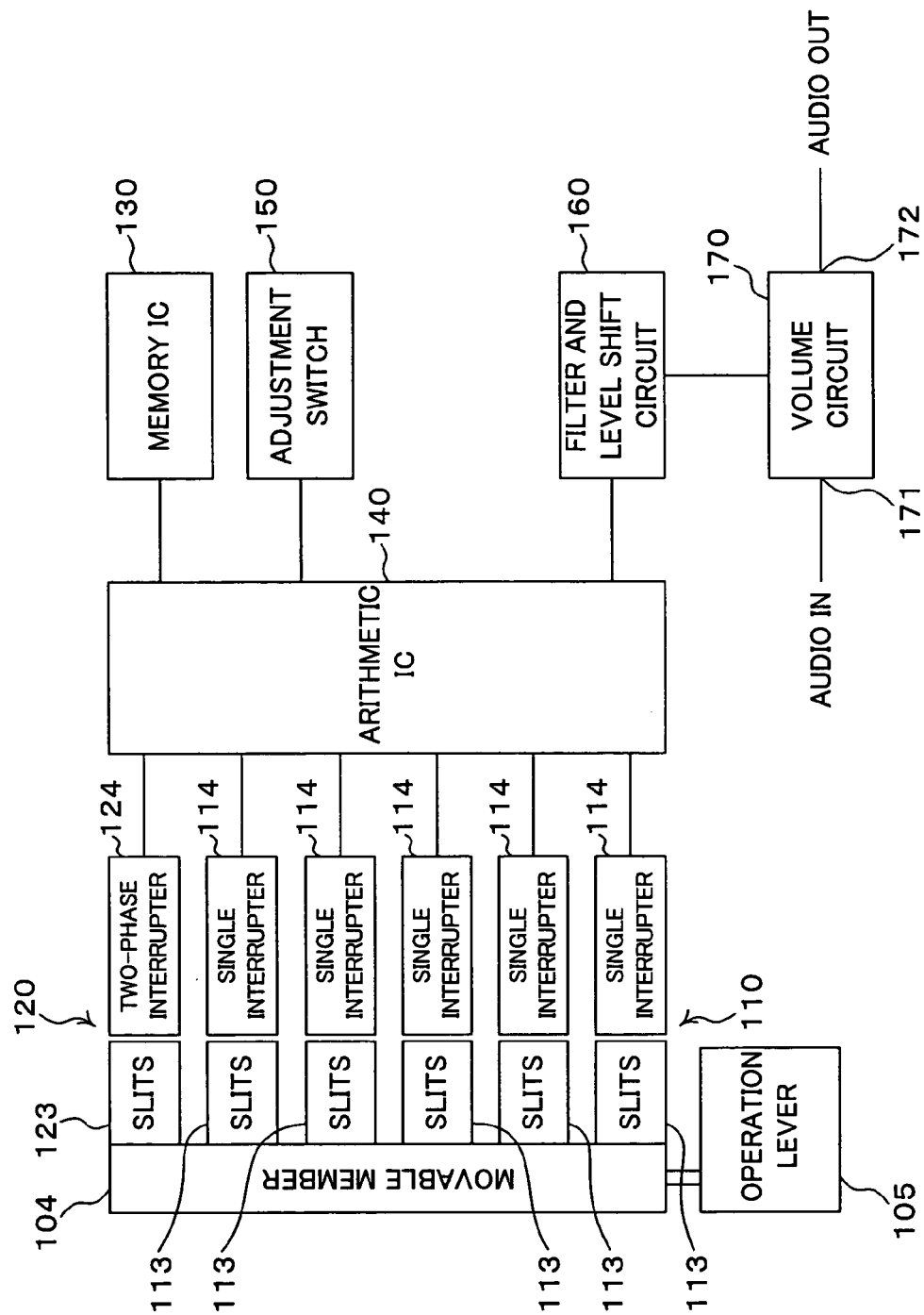
FIG. 3 is a block diagram showing a control system of the signal adjusting apparatus in one preferred embodiment according to the present invention.

As shown in FIGS. 1 to 3, the signal adjusting apparatus 100 in this embodiment comprises a main body 101 which is in the form of a box shape, a case member 102 which is accommodated in a front part of the main body 101, a pair of support members 103 each of which is in the form of a rod shape and attached to the case member 102, a movable member 104 which is movably supported by the support members 103, and an operation lever (fader) 105 which is in the form of a knob shape and connected to the movable member 104.

In addition to the operation lever 105, the main body 101 is equipped with a plurality of operation levers 106 each of which operates a variety of functions, a display unit 107 which displays a variety of pieces of information, and so on.

The case member 102 is equipped with a panel member 108 which is in the form of a plane shape and attached to the case member 102. The panel member 108 is formed with an opening 109 which extends in a width direction (hereinafter referred to as "crosswise direction") of the main body 101.

The operation lever 105 outwardly projects from the main body 101 through the opening 109 of the case member 102 to be handled by fingers of an operator.

The support members 103 are arranged in parallel relationship with each other and arranged in parallel relationship with the panel member 108. The movable member 104 is slidable in the crosswise direction along the support members 103.

In the signal adjusting apparatus 100 described above, the movable member 104 is connected to the operation lever 105 and movable in a predetermined movable range (for example, 45 mm), which is composed of a plurality of intervals, together with the operation lever 105 being reciprocally movable in the crosswise direction.

The signal adjusting apparatus 100 further comprises a linear encoder 110 as an example of first detecting device, a linear encoder 120 as an example of second detecting device, a memory IC (Integrated Circuit) 130 as examples of positional information storing device and adjustment information storing device, and an arithmetic IC (Integrated Circuit) 140 as examples of arithmetic device and adjusting device.

The linear encoder 110 is operative to detect one of the intervals (hereinafter referred to as "absolute position") where the movable member 104 is located. Specifically, the linear encoder 110 is the so-called non-contact type of positional sensor which is constituted by a first movable portion 111 attached to the movable member 104 and a first fixed portion 112 attached to the case member 102 to be spaced apart from the first movable portion 111.

The first movable portion 111 consists of a plurality of members each of which is formed with a plurality of slits, e.g. five-lines of slits 113. The first fixed portion 112 consists of a plurality of optical sensors, e.g. five single interrupters 114 each of which detects the slits 113 of the first movable portion 111, and a circuit board 115 which holds the single interrupters 114.

In this embodiment, while the linear encoder 110 is constituted by the first movable portion 111 with the slits 113 and the first fixed portion 112 with the single interrupters 114, the linear encoder 110 may be constituted by the first movable portion 111 with the single interrupters 114 and the first fixed portion 112 with the slits 113.

Figure 4:
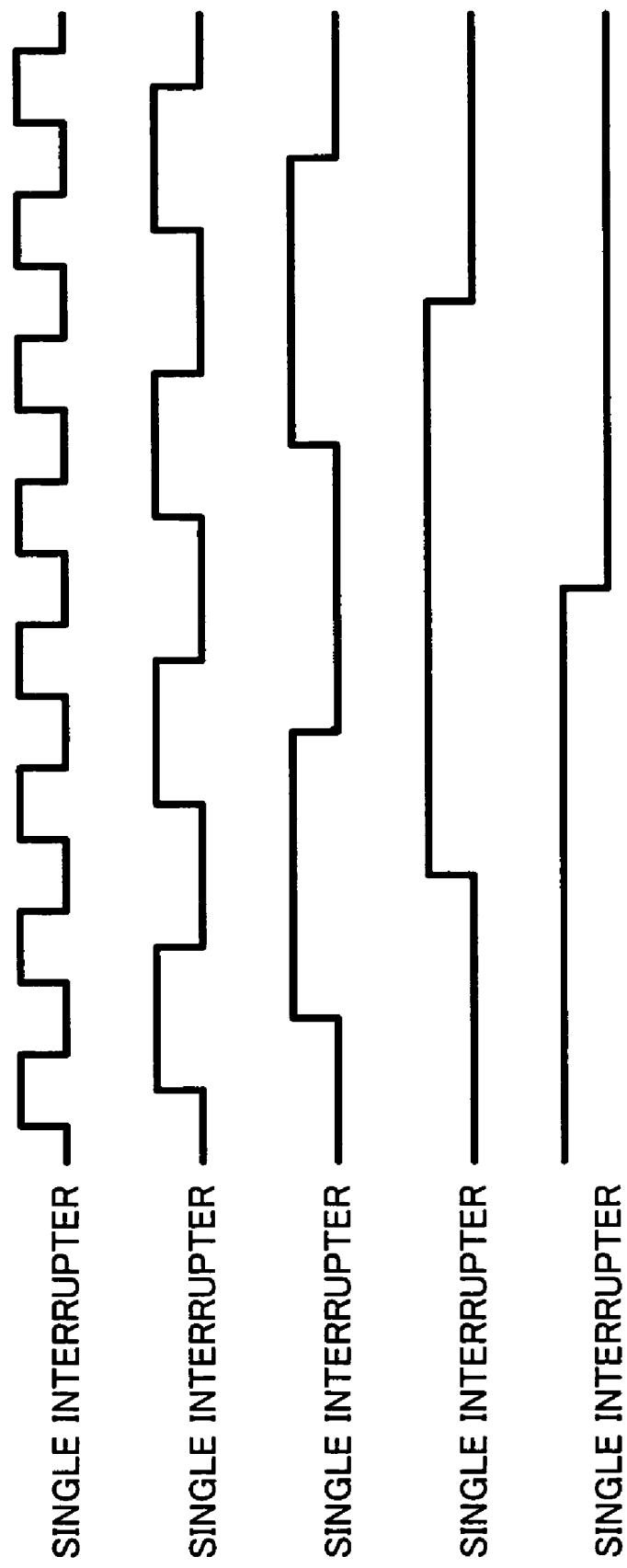
FIG. 4 is a schematic diagram showing a detection signal of a linear encoder forming part of the signal adjusting apparatus in one preferred embodiment according to the present invention.

The slits 113 of the first movable portion 111 are arranged to indicate a five-bits of gray code which divides the movable range of the movable member 104 into 32 intervals. On the other hand, as shown in FIG. 4, each of the single interrupters 114 is operative to output a detection signal, which indicates the five-bits of gray code, to the arithmetic IC 140 in the form of a digital signal.

The arithmetic IC 140 is operative to recognize the absolute position of the movable member 104 based on the detection signal from each of the single interrupters 114. Namely, the arithmetic IC 140 is operative to recognize the absolute position of the movable member 104 approximately in every 1.4 mm under the state that the movable range of the movable member 104 is 45 mm.

At this point, the gray code is used in the case that a decimal system is coded into a binary system, and limited to one bit which is changed from 0 to 1 or from 1 to 0 when the decimal system is changed by 1. This fact enables the arithmetic IC 140 to securely recognize a plurality of boundaries among the intervals of the movable range of the movable member 104.

The linear encoder 120 is operative to detect a position (hereinafter referred to as "relative position") of the movable member 104 within the interval detected by the linear encoder 110. Specifically, the linear encoder 120 is the so-called non-contact type of positional sensor which is constituted by a second movable portion 121 attached to the movable member 104, and a second fixed portion 122 attached to the case member 102 to be spaced apart from the second movable portion 121.

The second movable portion 121 consists of a member which is formed with a plurality of slits, e.g. one-line of slits 123. The second fixed portion 122 consists of an optical sensor, e.g. one two-phase interrupter 124 which detects the slits 123 of the second movable portion 121, and the circuit board 115 which holds the two-phase interrupters 124.

In this embodiment, while the linear encoder 120 is constituted by the second movable portion 121 with the slits 123 and the second fixed portion 122 with the two-phase interrupter 124, the linear encoder 120 may be constituted by the second movable portion 121 with the two-phase interrupter 124 and the second fixed portion 122 with the slits 123.

Figure 5:
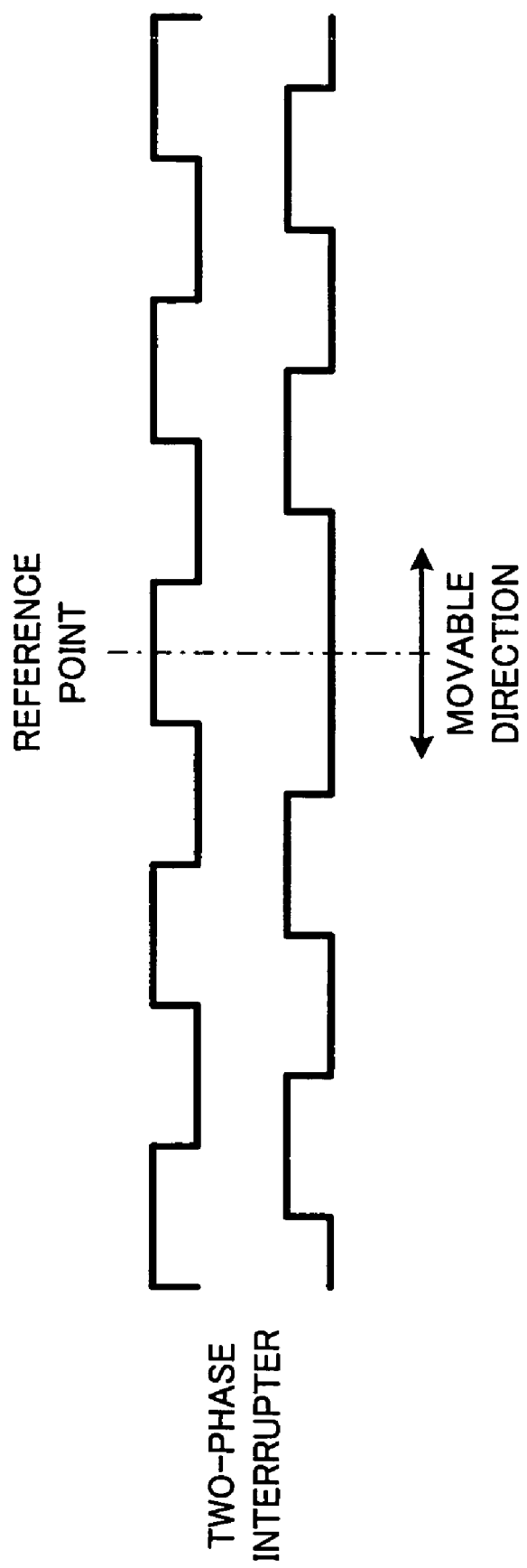
FIG. 5 is a schematic diagram showing a detection signal of a linear encoder forming part of the signal adjusting apparatus in one preferred embodiment according to the present invention.

The slits 123 of the second movable portion 121 are arranged to indicate a 150-LPI (Lines per Inch) of binary code which allocates about 1000-points of addresses to the movable range of the movable member 104 under the state that the movable range of the movable member 104 is 45 mm. On the other hand, as shown in FIG. 5, the two-phase interrupter 124 is operative to output a detection signal, which indicates a string of two-phase pulses, to the arithmetic IC 140 in the form of a digital signal.

The arithmetic IC 140 is operative to recognize the relative position of the movable member 104 based on the detection signal from the two-phase interrupter 124. Namely, the arithmetic IC 140 is operative to recognize the relative position of the movable member 104 approximately in every 0.045 mm under the state that the movable range of the movable member 104 is 45 mm.

At this point, the string of two-phase pulses has a phase difference of a quarter of a period, and has a phase relationship which is inverted in accordance with a movable direction from a reference point of the movable member 104. This fact enables the arithmetic IC 140 to securely recognize the movable direction from the reference point of the movable member 104.

Figure 6:
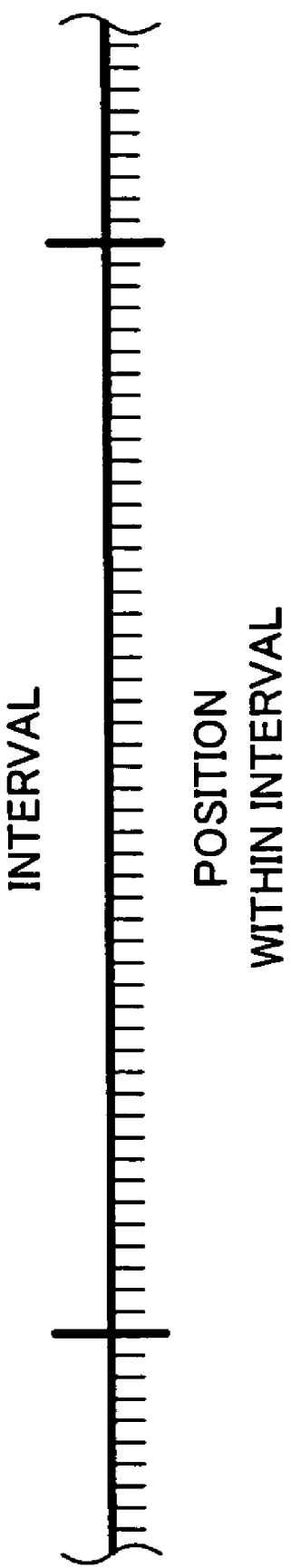
FIG. 6 is a schematic diagram showing positional information stored in a memory IC forming part of the signal adjusting apparatus in one preferred embodiment according to the present invention.

The memory IC 130 is operative to store positional information which indicates a relationship between the absolute position detected by the linear encoder 110 and the relative position detected by the linear encoder 120. As shown in FIG. 6, the positional information indicates a correspondence between the interval where the movable member 104 is located and the position of the movable member 104, i.e. a count of the pulses of the two-phase interrupter 124.

The memory IC 130 is then operative to store the positional information when the movable member 104 is moved from one end to the other end of the movable range of the movable member 104. Therefore, the positional information includes information which indicates a correspondence between the positions of one end and the other end of the movable range of the movable member 104 and the count of the pulses of the two-phase interrupter 124, and information which indicates a correspondence between the positions of the boundaries among the intervals of the movable range of the movable member 104 and the count of the pulses of the two-phase interrupter 124. The process in which the memory IC 130 stores the positional information will be described below.

The arithmetic IC 140 is operative to calculate the absolute position of the movable member 104 from the relative position detected by the linear encoder 120 based on the positional information stored in the memory IC 130. This fact enables the arithmetic IC 140 to securely recognize the absolute position of the movable member 104. Namely, the arithmetic IC 140 is operative to recognize the absolute position of the movable member 104 approximately in every 0.045 mm, which corresponds to the detection accuracy of the relative position of the movable member 104, under the state that the movable range of the movable member 104 is 45 mm. The process in which the arithmetic IC 140 calculates the absolute position of the movable member 104 will be described below.

Figure 7:
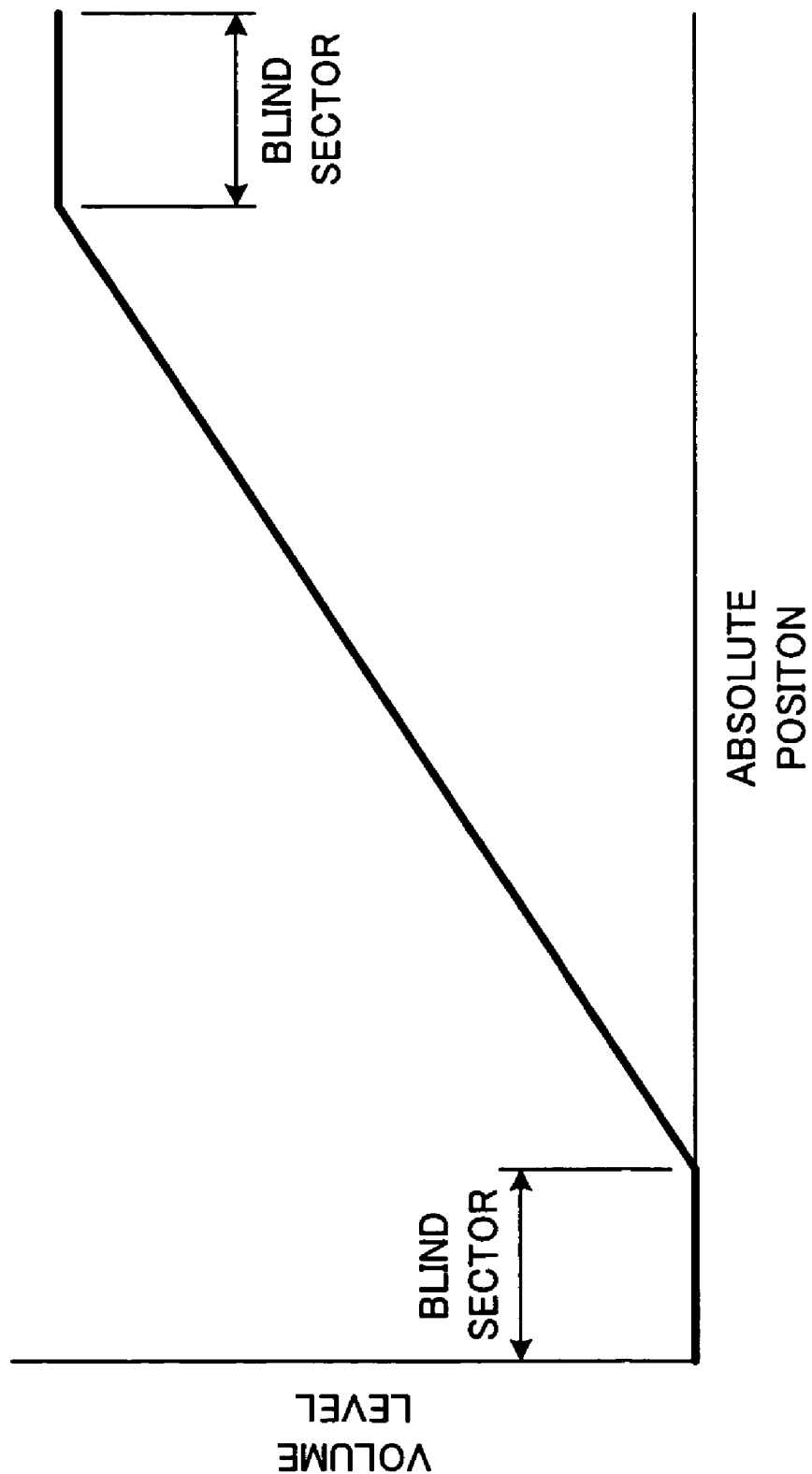
FIG. 7 is a schematic diagram showing adjustment information stored in a memory IC forming part of the signal adjusting apparatus in one preferred embodiment according to the present invention.

The memory IC 130 is operative to store adjustment information such as a volume curve. As shown in FIG. 7, the adjustment information indicates an adjustment state, e.g. a volume level of the audio signal corresponding to the absolute position of the movable member 104 calculated by the arithmetic IC 140. In this embodiment, the volume level of the audio signal is increased under the state that the movable member 104 is moved from one end (left side of FIG. 7) to the other end (right side of FIG. 7) of the movable range of the movable member 104. Incidentally, the volume level of the audio signal is fixed in the range where the movable member 104 is moved from one end and the other end of the movable range of the movable member 104, and the range is the so-called blind sector.

The arithmetic IC 140 is operative to adjust the audio signal based on the adjustment information stored in the memory IC 130. Specifically, the arithmetic IC 140 is operative to read out the volume level of the audio signal from the adjustment information stored in the memory IC 130 based on the absolute position of the movable member 104 calculated by the arithmetic IC 140, and is operative to output an adjustment signal, which is used for adjusting the volume level of the audio signal, to the below-described filter and level shift circuit 160 in the form of a digital signal such as a PWM (Pulse Width Modulation) signal.

The signal adjusting apparatus 100 further comprises an adjustment switch 150 which is used for obtaining the positional information, a filter and level shift circuit 160 which converts the adjustment signal from the arithmetic IC 140 into analog potential, and a volume circuit 170 such as a VCA (Voltage Controlled Amplifier) which adjusts the volume level of the audio signal based on the analog potential from the filter and level shift circuit 160. The volume circuit 170 is equipped with an input port 171 having the audio signal inputted therethrough, and an output port 172 having the audio signal outputted therethrough.

In the signal adjusting apparatus 100 described above, the audio signal, which is inputted to the input port 171, is adjusted to the predetermined volume level corresponding to the absolute position of the movable member 104, and is outputted from the output port 172.

In this embodiment, while the audio signal is inputted and outputted through one channel, the audio signal may be inputted and outputted through two channels.

Figure 8:
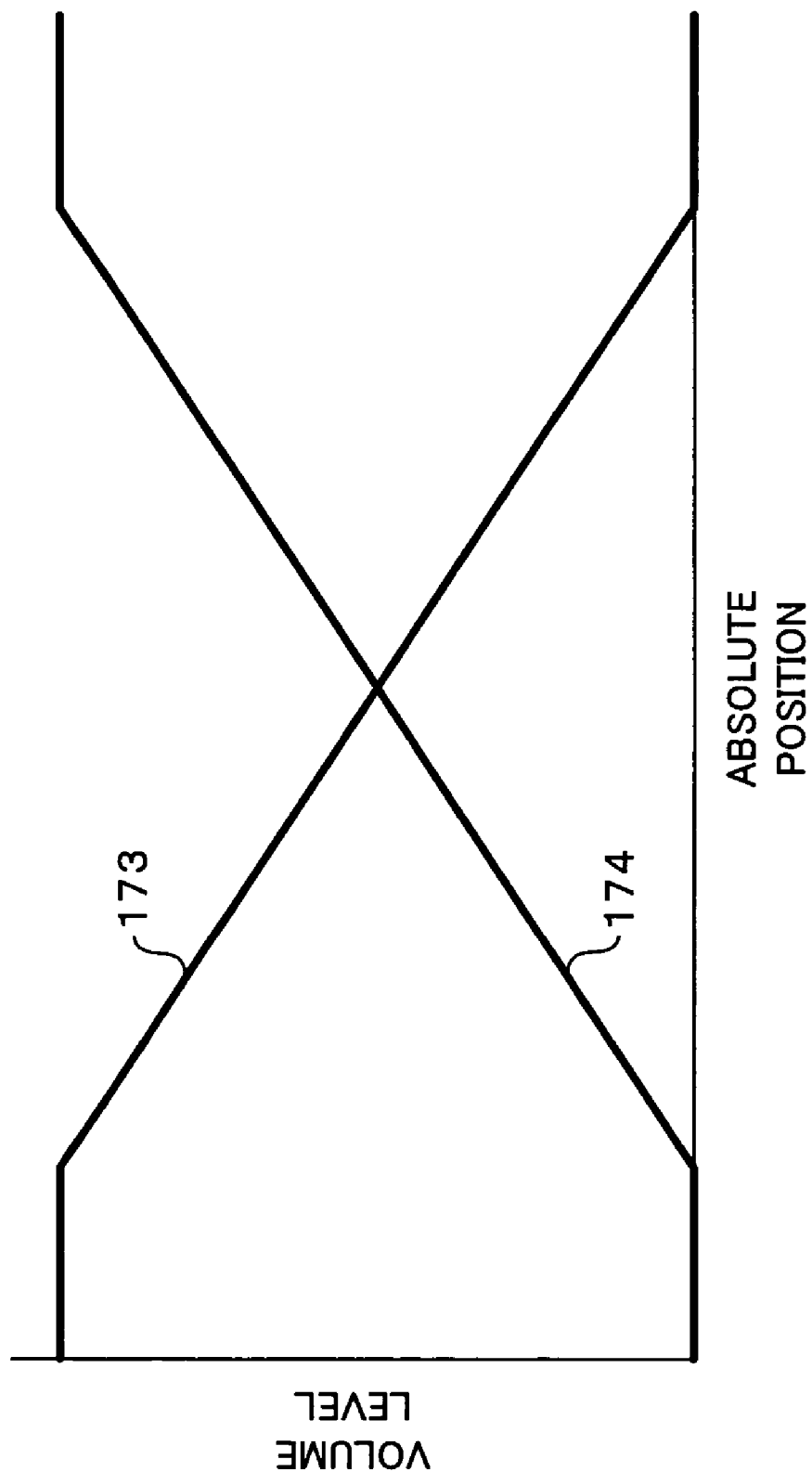
FIG. 8 is a schematic diagram showing adjustment information stored in a memory IC forming part of the signal adjusting apparatus in one preferred embodiment according to the present invention.

As shown in FIG. 8, in the case that the audio signal is inputted and outputted through two channels, the volume level of the audio signal 173 is decreased to perform a fade-out, and the volume level of the audio signal 174 is increased to perform a fade-in under the state that the movable member 104 is moved from one end (left side of FIG. 8) to the other end (right side of FIG. 8) of the movable range of the movable member 104. The signal adjusting apparatus, which is designed to simultaneously adjust the two-kinds of audio signals by one operation lever (fader), is then generally referred to as "cross fader".

The operation of the signal adjusting apparatus in this embodiment will be described hereinafter.

The process in which the memory IC 130 stores the positional information will be described hereinafter. Actually, the process of storing the positional information is performed under the state that the signal adjusting apparatus 100 is manufactured.

Figure 9:
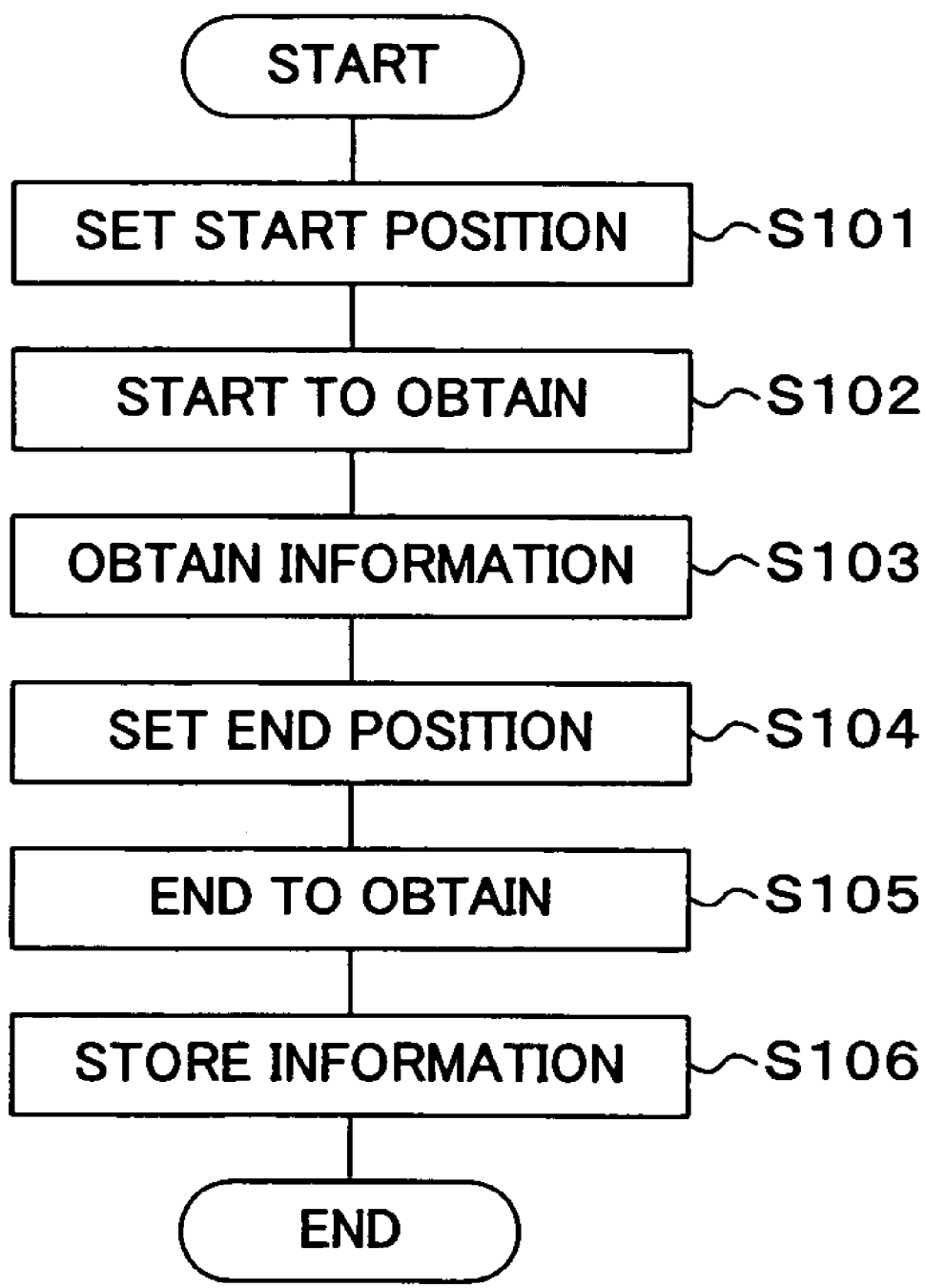
FIG. 9 is a flowchart showing a process of storing positional information in a memory IC forming part of the signal adjusting apparatus in one preferred embodiment according to the present invention.

As shown in FIG. 9, in the process of storing the positional information, the operation lever 105 is handled to set the movable member 104 in a start position, e.g. one end of the movable range of the movable member 104 in step S101. When the adjustment switch 150 is handled to turn on, the arithmetic IC 140 starts to obtain the positional information in step S102.

When the movable member 104 is moved from one end to the other end of the movable range of the movable member 104 with the operation lever 105 being handled, as shown in FIG. 6, the arithmetic IC 140 obtains the positional information which indicates the correspondence between the interval where the movable member 104 is located and the position of the movable member 104, i.e. the count of the pulses of the two-phase interrupter 124 in step S103.

Subsequently, the movable member 104 is set to an end position, e.g. the other end of the movable range of the movable member 104 with the operation lever 105 being handled in step S104. When the adjustment switch 150 is handled to turn off, the arithmetic IC 140 ends to obtain the positional information in step S105.

Finally, the arithmetic IC 140 causes the memory IC 130 to store the positional information in step S106, and the process of storing the positional information is then finished.

The process in which the arithmetic IC 140 calculates the absolute position will be described hereinafter. Actually, the process of calculating the absolute position is performed under the state that the signal adjusting apparatus 100 is handled.

Figure 10:
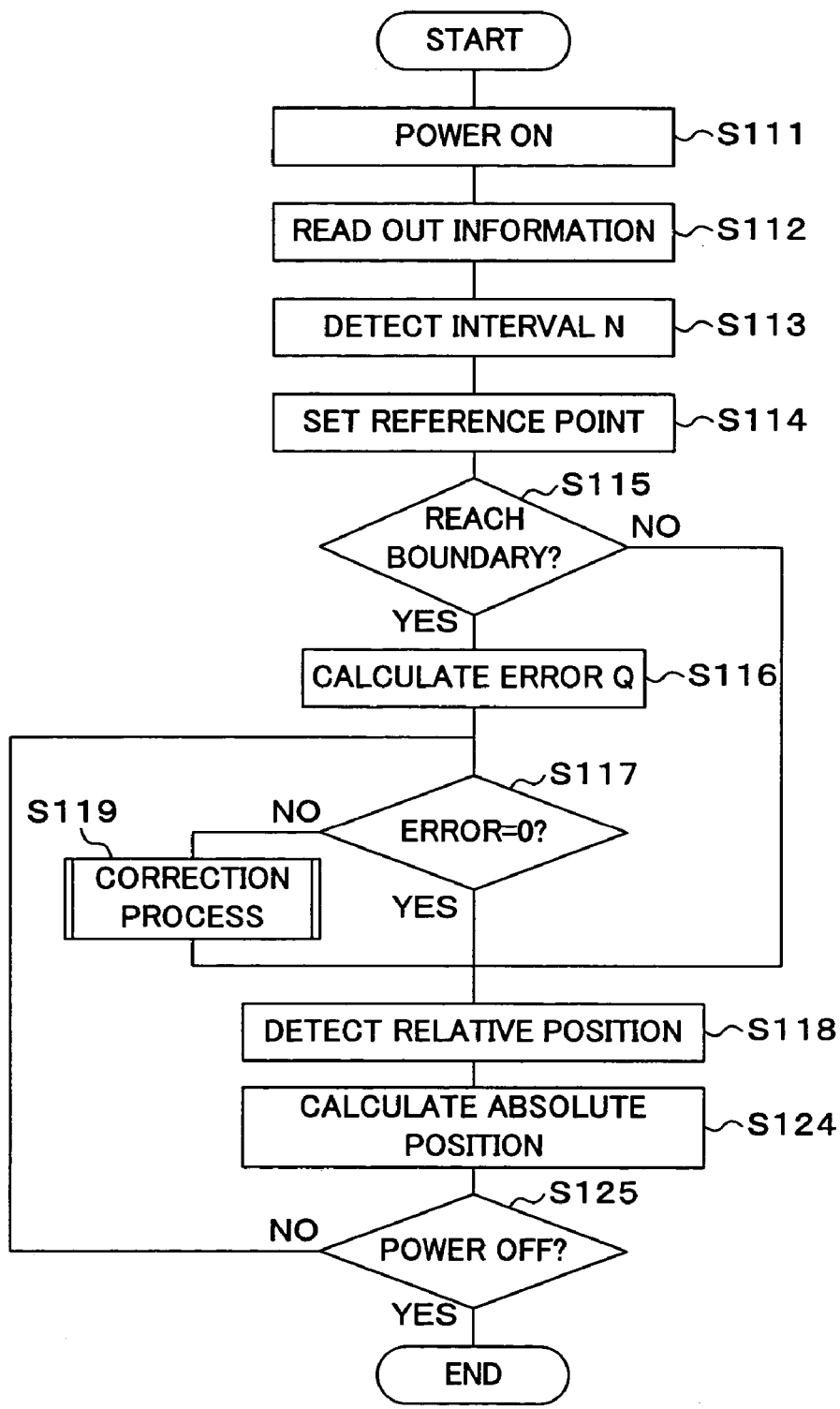
FIG. 10 is a flowchart showing a process of calculating an absolute position with an arithmetic IC forming part of the signal adjusting apparatus in one preferred embodiment according to the present invention.
Figure 11:
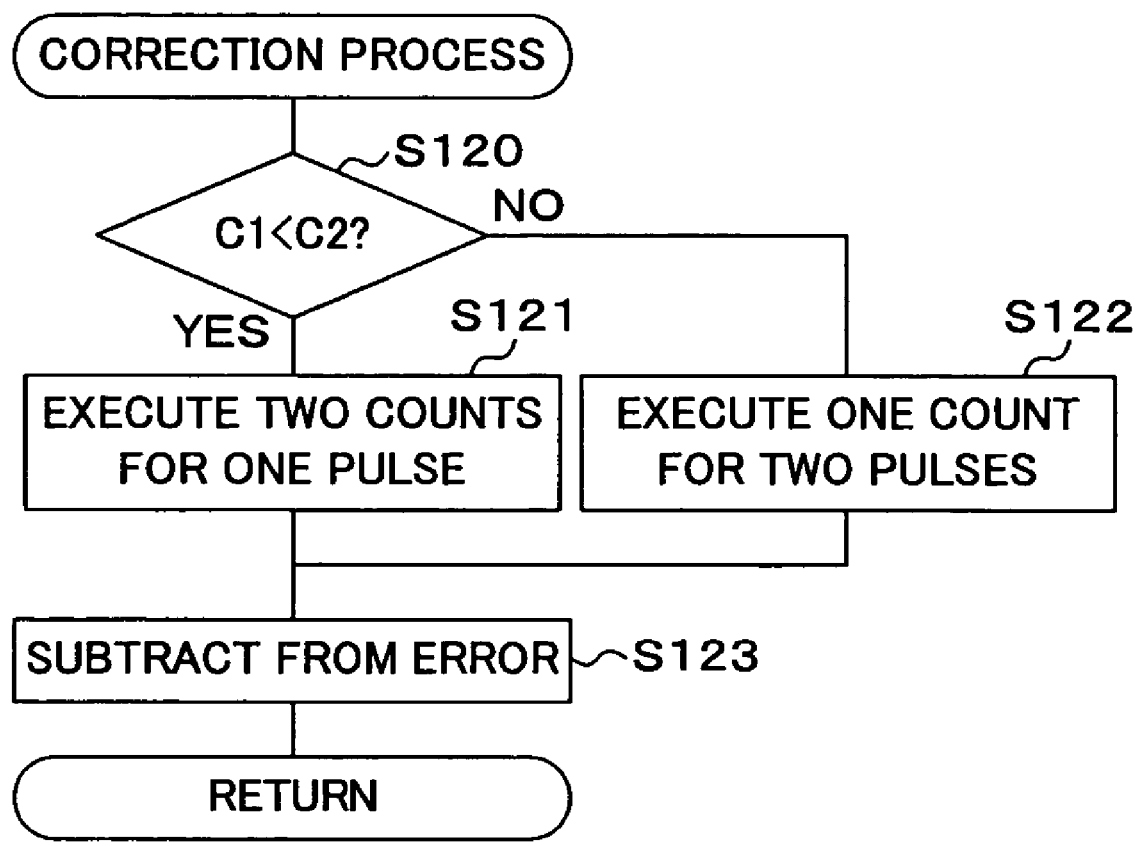
FIG. 11 is a flowchart showing a process of calculating an absolute position with an arithmetic IC forming part of the signal adjusting apparatus in one preferred embodiment according to the present invention.
Figure 12:
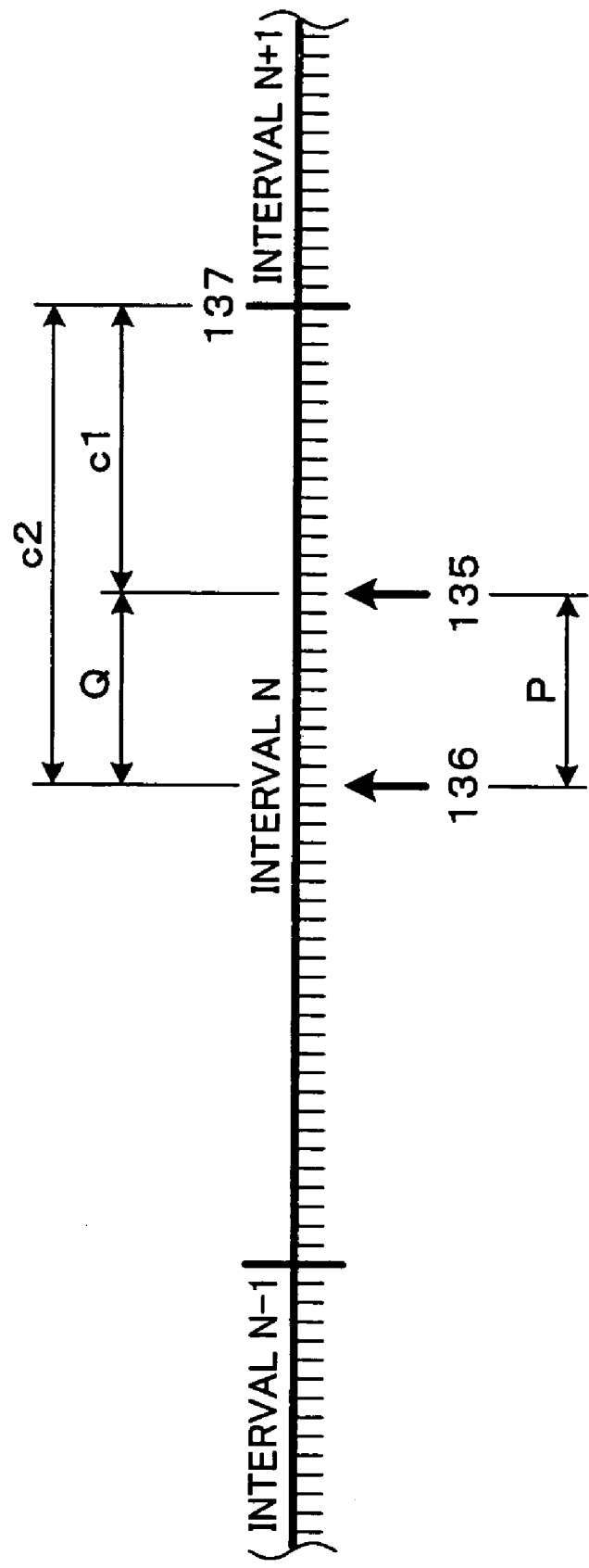
FIG. 12 is a schematic diagram showing positional information under the state that an absolute position is calculated in an arithmetic IC forming part of the signal adjusting apparatus in one preferred embodiment according to the present invention.

As shown in FIGS. 10 to 12, in the process of calculating the absolute position, after the power of the signal adjusting apparatus 100 is turned on in step S111, the arithmetic IC 140 reads out the positional information from the memory IC 130 in step S112, and detects an interval n where the movable member 104 is located in step S113. When the power of the signal adjusting apparatus 100 is turned on in step S111, the movable member 104 is, for example, stopped at an initial position 135.

Subsequently, the arithmetic IC 140 sets a reference point 136 in order to detect the relative position of the movable member 104 in step S114. At this point, the arithmetic IC 140 sets the reference point 136 to a center of the interval n based on the positional information. Therefore, in the case that the initial position 135 and the reference point 136 generate an error P therebetween, the below-described correction process is performed in order to correct the error P.

When the movable member 104 is, for example, moved toward the other end (right side of FIG. 12) of the movable range of the movable member 104 with the operation lever 105 being handled, the arithmetic IC 140 decides whether the movable member 104 reaches a boundary 137 of the interval n or not in step S115. When the movable member 104 does not reach the boundary 137 of the interval n (in the case of "No" in step S115), the process of calculating the absolute position is transferred to the next process in step S118.

On the other hand, when the movable member 104 reaches the boundary 137 of the interval n (in the case of "YES" in step S115), the arithmetic IC 140 compares a count c1 of the pulses from the linear encoder 120 and a count c2 of the pulses between the reference point 136 and the boundary 137, and calculates an error Q between the count c1 and the count c2 in step S116. Incidentally, the error Q corresponds to the error P.

Subsequently, the arithmetic IC 140 decides whether the error Q is zero or not in step S117. When the error Q is zero (in the case of "YES" in step S117), the process of calculating the absolute position is transferred to the next process in step S118. When the error Q is not zero (in the case of "NO" in step S117), the process of calculating the absolute position is transferred to the correction process in step S119.

In the correction process, the arithmetic IC 140 decides whether the count c1 is smaller than the count c2 or not in step S120. When the count c1 is smaller than the count c2 (in the case of "YES" in step S120), the error Q is corrected by executing two counts for one pulse in step S121. On the other hand, when the count c1 is larger than the count c2 (in the case of "NO" in step S120), the error Q is corrected by executing one count for two pulses in step S122. When the arithmetic IC 140 subtracts one from the error Q in step S123, the process of calculating the absolute position is transferred to the next process in step S118. The correction process is repeated until the error Q becomes zero.

Subsequently, the arithmetic IC 140 detects the relative position of the movable member 104, i.e. the count of the pulses in step S118, and calculates the absolute position of the movable member 104 from the relative position of the movable member 104 in step S124.

Finally, the arithmetic IC 140 decides whether the power of the signal adjusting apparatus 100 is turned off or not in step S125. When the power is turned off (in the case of "YES" in step S125), the process of calculating the absolute position is then finished. On the other hand, when the power is not turned off (in the case of "NO" in step S125), the process of calculating the absolute position is transferred to the process of deciding whether the error Q is zero or not in step S117, and repeats a series of the processes.

As described above, in this embodiment, the fact that each of the linear encoders 110 and 120 is a non-contact type of positional sensor which has no electrical and mechanical contact leads to the fact that the signal adjusting apparatus 100 can prevent the malfunction which is caused by the abrasion of the components, and can securely adjust the volume level of the audio signal. Furthermore, the signal adjusting apparatus 100 can reduce the detection error which is caused by a change of temperature, and can be rapid in response from the operation of the operation lever 105 to the adjustment of the volume level of the audio signal.

In this embodiment, the fact that each of the linear encoders 110 and 120 is constituted by the optical sensor and the member formed with the slits, and is constituted by the general-purpose components leads to the fact that the signal adjusting apparatus 100 can facilitate to select the components, and can reduce the production cost.

In this embodiment, the fact that the slits of the linear encoder 110 are arranged to indicate the gray code leads to the fact that the continuity of the detection signal cannot be lost by dispersion of the slits, and the boundary of the interval where the movable member 104 is located can be securely recognized.

In this embodiment, the fact that the memory IC 130 stores the positional information under the state that the apparatus is manufactured leads to the fact that the errors which is caused by the component accuracy, the assembling accuracy, and so on can be held as a parameter, and the absolute position of the movable member 104 can be precisely recognized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2003-207946 filed on Aug. 19, 2003 including the specification, claims, drawings and summary is incorporated herein by reference in its entirety.

What is claimed is:

1. A signal adjusting apparatus which adjusts an electrical signal, comprising:
    a movable member which is movable in a movable range composed of a plurality of intervals;
    a first detecting device which detects one of the intervals where the movable member is located, the first detecting device being constituted by a first movable portion mounted on the movable member and a first fixed portion spaced apart from the first movable portion, said one of the intervals being an absolute position of the movable member;
    a second detecting device which detects a relative position of the movable member within the interval detected by the first detecting device, the second detecting device being constituted by a second movable portion mounted on the movable member and a second fixed portion spaced apart from the second movable portion; and
    a correction device which corrects the detected relative position based on a relationship between the absolute position and the relative position stored in a memory in advance.

2. The signal adjusting apparatus according to claim 1, wherein the first movable portion consists of a plurality of members each of which is formed with a plurality of slits, and wherein the first fixed portion consists of a plurality of optical sensors each of which detects the slits of each of the members.

3. The signal adjusting apparatus according to claim 2, wherein the slits of each of the members are arranged to indicate a gray code.

4. The signal adjusting apparatus according to claim 1, wherein the second movable portion consists of a member formed with a plurality of slits, and wherein the second fixed portion consists of an optical sensor detecting the slits of the member.

* * * * *